(12) United States Patent
Chandler

(10) Patent No.: US 11,072,528 B2
(45) Date of Patent: Jul. 27, 2021

(54) HALOGEN GENERATOR

(71) Applicant: FEI Company, Hillsboro, OR (US)

(72) Inventor: Clive Chandler, Hillsboro, OR (US)

(73) Assignee: FEI Company, Hillsboro, OR (US)

( * ) Notice: Subject to any disclaimer, the term of this patent is extended or adjusted under 35 U.S.C. 154(b) by 38 days.

(21) Appl. No.: 16/390,617

(22) Filed: Apr. 22, 2019

(65) Prior Publication Data

US 2020/0331752 A1  Oct. 22, 2020

(51) Int. Cl.
*C01B 7/09* (2006.01)
*C01B 7/03* (2006.01)
*B01J 15/00* (2006.01)

(52) U.S. Cl.
CPC ............... *C01B 7/096* (2013.01); *B01J 15/00* (2013.01); *C01B 7/03* (2013.01)

(58) Field of Classification Search
CPC ... C01B 7/03; C01B 7/096; C01B 7/14; B01J 15/00
See application file for complete search history.

(56) References Cited

U.S. PATENT DOCUMENTS 4,118,194 A * 10/1978 Raleigh .............. G01N 27/4045
204/410

OTHER PUBLICATIONS

NJ-Health, Department of Health, "Right to Know Hazardous Substance Fact Sheet: Acetyl Chloride", Oct. 2016, 6 pages, taken from https://www.nj.gov/health/eoh/rtkweb/documents/fs/0013.pdf. (Year: 2016).*

* cited by examiner

*Primary Examiner* — Ngoc-Yen Nguyen
(74) *Attorney, Agent, or Firm* — Klarquist Sparkman, LLP

(57) ABSTRACT

Disclosed herein are embodiments of a method and system for producing a halogen gas. The method may comprise contacting a solid oxidizing agent with a vapor comprising a halide compound, to produce a gas stream comprising a halogen corresponding to the halide in the halide compound. The halide compound may be an acyl halide, such as an acetyl halide or an oxalyl halide. The oxidizing agent may be any suitable oxidizing agent, and in certain examples, potassium permanganate is used. The method may be performed under a reduced pressure. Also disclosed herein is a system suitable to perform the disclosed method. The system may comprise a reservoir, an oxidizing agent support and a gas stream outlet.

20 Claims, 1 Drawing Sheet

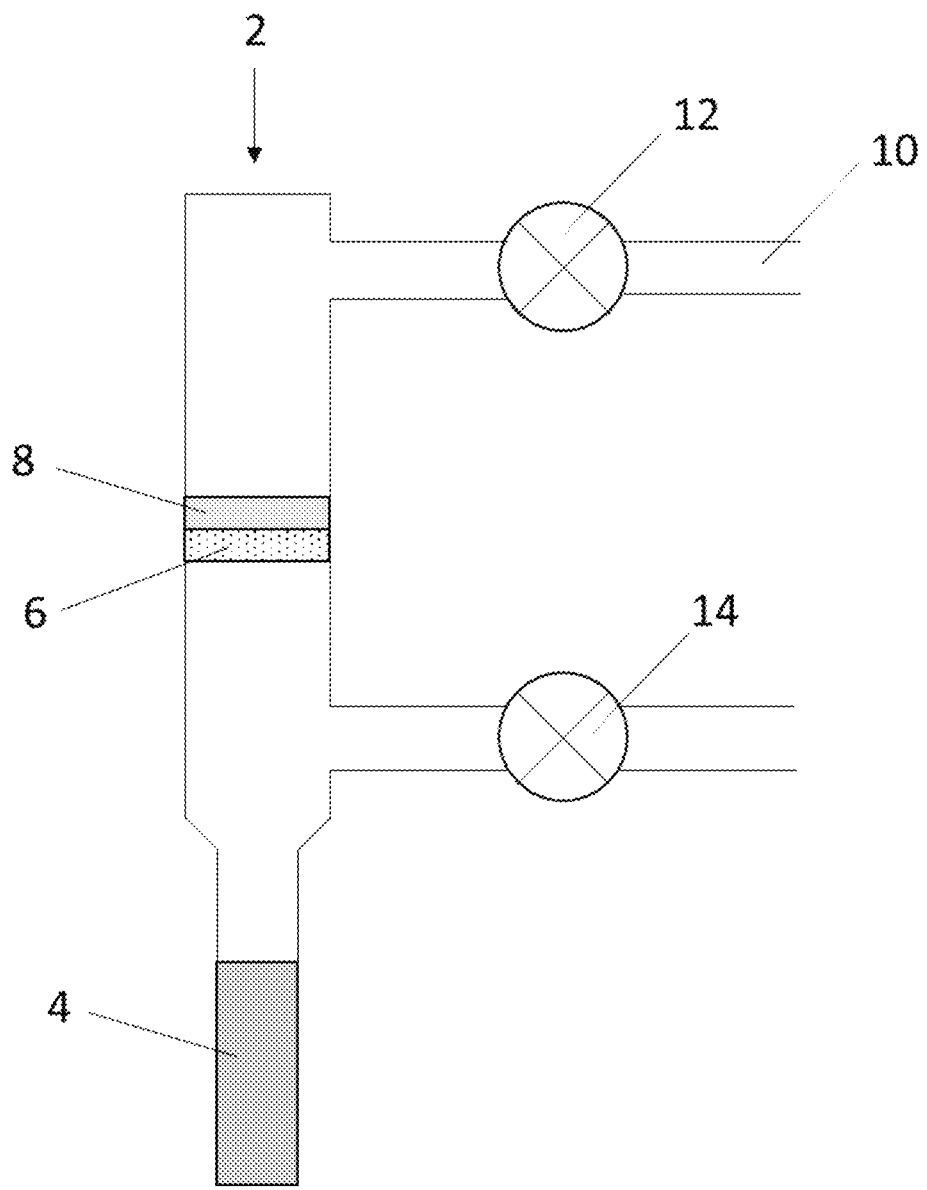

HALOGEN GENERATOR

SUMMARY

Disclosed herein are embodiments of a method and system for generating a gas steam comprising a halogen gas, particularly chlorine or bromine gas. In some embodiments, the method comprises contacting a solid oxidizing agent with a vapor comprising a halide compound to produce a gas stream comprising a halogen gas. The halide compound may be an acyl halide, such as an acetyl halide, an oxalyl halide, or a combination thereof. In some embodiments, the halide compound is acetyl chloride or acetyl bromide, but in other embodiments, the halide compound is oxalyl chloride or oxalyl bromide. And/or in certain embodiments, the halogen gas is chlorine or bromine.

In any embodiments, the oxidizing agent may comprise a permanganate, dichromate, hypochlorite, hypobromite, chlorate, bromate, chlorite, bromite, perchlorate, perbromate, chlorochromate, perborate, bismuthate, nitrate, chromate, trioxide, or a combination thereof. And/or the oxidizing agent may comprise lithium, calcium, barium, sodium, potassium, magnesium, chromium, or a combination thereof. In certain embodiments, the oxidizing agent comprises potassium permanganate, potassium chromate, chromium trioxide, sodium chromate, sodium dichromate, potassium dichromate, potassium chlorochormate, sodium bismuthate, potassium nitrate, sodium perborate, sodium hypochlorite, sodium chlorite, sodium chlorate, sodium perchlorate, sodium hypobromite, sodium bromite, sodium bromate, sodium perbromate, osmium tetroxide, ruthenium tetroxide, or a combination thereof, and in particular embodiments, the oxidizing agent is potassium permanganate.

The method may comprise contacting the solid oxidizing agent with the vapor at a pressure of from greater than zero to less than 1 atmosphere, such as from 1 Torr to 650 Torr, from 10 Torr to 600 Torr, from 50 Torr to 500 Torr, from 50 Torr to 300 Torr, or from 100 Torr to 250 Torr.

Additionally, or alternatively, the halide compound may be at a temperature of from −200° C. to 50° C., such as from −80° C. to 30° C., or from 0° C. to 25° C. And/or the method may comprise contacting the solid oxidizing agent with the vapor at a vapor pressure of the halide compound at the temperature.

In some embodiments, the halide compound is or comprises acetyl halide, and the gas stream further comprises acetic anhydride.

In one embodiments, the method comprises contacting potassium permanganate with acetyl chloride vapor at 600 Torr and from 20° C. to 30° C. to produce a gas stream comprising chlorine gas.

In one embodiments, the method comprises contacting potassium permanganate with acetyl bromide vapor at 130 Torr and from 20° C. to 30° C. to produce a gas stream comprising bromine gas.

In any embodiments, the method may further comprise using the gas stream in an ion beam apparatus.

Also disclosed are embodiments of a system comprising a halide compound reservoir, an oxidizing agent support fluidly coupled to the reservoir, and a gas stream outlet.

The foregoing and other objects, features, and advantages of the invention will become more apparent from the following detailed description, which proceeds with reference to the accompanying FIGURES.

BRIEF DESCRIPTION OF THE DRAWINGS

FIG. 1 is a schematic diagram of an exemplary apparatus suitable to practice certain embodiments of the disclosed method.

DETAILED DESCRIPTION

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

"Halogen" or "halide" refers to fluorine, chlorine, bromine, or iodine, or the corresponding halide, particularly chlorine or bromine.

"Acyl" refers to a R—C(O)— or —(O)C—R—C(O)— moiety, where R is a substantially hydrocarbon-based group or moiety, including aryl, alkyl, alkenyl, alkynyl groups, cyclic versions thereof, such as cycloalkyl, cycloalkenyl or cycloalkynyl, and further including straight- and branched-chain arrangements, and all stereo and position isomers as well. Unless expressly stated otherwise, an acyl moiety contains from one to twenty-five carbon atoms; for example, from one to fifteen, from one to ten, from one to six, or from one to four carbon atoms. Exemplary acyl moieties include, but are not limited to, formyl, acetyl, propionyl, butyryl, isobutyryl, oxalyl, malonyl, succinyl, and benzoyl.

II. Overview

Halogen gases, such as chlorine and bromine gases, are toxic and corrosive, making storage and safe usage of such gases problematic. For example, chlorine gas sensors are often required when storing chlorine gas, even if the gas is stored in a gas bottle. Bromine is not offered for certain applications because it is so difficult to handle. Bromine liquid corrodes stainless steel weldings and is best stored in Hastelloy-lined containers that are very expensive. Certain applications use gas boxes to deliver halogen gases, such as chlorine and bromine, to a system. However, these are expensive to build, take up a lot of space, and require separate venting of the gas box. And for some applications, such as beam etching applications, alternatives to chlorine and bromine, such as $XeF_2$, have limited uses. $XeF_2$ is too corrosive for many applications, such as silicon etching, as it reacts spontaneously with silicon.

III. Method and System

Disclosed herein is a method and system for producing halogen gas, such as chlorine or bromine gas. The method and system is suitable for a variety of applications including, but not limited to, beam processing including beam etching applications, and synthesis applications. The halogen gas may be provided at sub-atmospheric pressure. The halogen gas is produced on demand, and production of the gas can be stopped as desired. This circumvents the need to store the gas, and reduces or eliminates may of the issues described above, such as chlorine gas sensors, Hastelloy containers, separate venting and/or gas boxes. Accordingly, the disclosed method and system have significant cost and safety benefits over other halogen gas delivery systems.

A. Method

In some embodiments, the method comprises contacting an oxidizing agent, typically, a solid oxidizing agent, with a vapor comprising a halide compound, to produce a gas stream comprising a halogen gas corresponding to the halide in the halide compound. In some embodiments, the vapor consists essentially of, or consists of, the halide compound. That is, the vapor does not comprise other volatile organic compounds, solvents, and/or water vapor, in amounts that may interfere or detract from an end use of the halogen gas. In some embodiments, the vapor does not comprise a detectable amount of an additional volatile organic compound, solvent, and/or water vapor.

A person of ordinary skill in the art understands that the gas stream also includes one or more oxidation product(s) resulting from the production of the halogen gas. For example, if the halide compound is acetyl chloride, the gas stream may comprise chlorine gas and one or more oxidation products of the acetyl moiety, such as acetic anhydride. And in some embodiments, the gas stream consists essentially of, or consists of, the halogen gas and the oxidation product(s) from the halide compound.

In some embodiments, the halide compound is an acyl halide, such as a compound derived from a carboxylic acid. The acyl halide may be formyl halide, acetyl halide, propionyl halide, butyryl halide, isobutyryl halide, oxalyl halide, malonyl halide, succinyl halide, benzoyl halide, or a combination thereof. In any embodiments, the halide may be fluoride, chloride, bromide, or iodide. In certain embodiments, the halide compound is a chloride compound, such as an acyl chloride, but in other embodiments, the halide compound is a bromide compound, such as an acyl bromide. In particular embodiments, the acyl halide is formyl chloride, acetyl chloride, propionyl chloride, butyryl chloride, isobutyryl chloride, oxalyl chloride, malonyl chloride, succinyl chloride, benzoyl chloride, or a combination thereof. And in other particular embodiments, the acyl halide is formyl bromide, acetyl bromide, propionyl bromide, butyryl bromide, isobutyryl bromide, oxalyl bromide, malonyl bromide, succinyl bromide, benzoyl bromide, or a combination thereof. The acyl halide may be selected from acetyl chloride, acetyl bromide, oxalyl chloride, oxalyl bromide, or a combination thereof. And in some embodiments, the acyl halide is acetyl chloride, and in other embodiments, the acetyl halide is acetyl bromide.

The specification and/or purity of the halide compound may be any specification and/or purity suitable for use in the disclosed method. In certain embodiments, the halide compound is at least 95% pure, such as at least 96%, at least 97%, at least 98%, at least 99%, or at least 99.5% pure halide compound, as determined by a suitable techniques, such as gas chromatography (GC) and/or titration.

In certain embodiments, the acyl halide comprises, consists essentially of, or consists of acetyl chloride, and the gas stream comprises, consists essentially of, or consists of, chlorine gas and one or more oxidation products from the acetyl moiety, such as, but not limited to, acetic anhydride.

In other embodiments, the acyl halide comprises, consists essentially of, or consists of acetyl bromide, and the gas stream comprises, consists essentially of, or consists of, bromine gas and one or more oxidation products from the acetyl moiety, such as, but not limited to, acetic anhydride.

In any embodiments, the acyl halide may be a liquid at room temperature and pressure, such as at 25° C. and 1 atmosphere pressure.

The oxidizing agent may be any oxidizing agent suitable to produce a halogen gas from the halide compound. In certain embodiments, the oxidizing agent is a solid oxidizing agent. Suitable oxidizing agents may comprise a moiety selected from a permanganate, dichromate, hypochlorite, hypobromite, chlorate, bromate, chlorite, bromite, perchlorate, perbromate, chlorochromate, perborate, bismuthate, nitrate, chromate, trioxide, tetroxide, or a combination thereof. The oxidizing agent may further comprise a counter ion, typically a metal counter ion, such as, but not limited to, lithium, calcium, barium, sodium, potassium, magnesium, chromium, osmium, ruthenium, or a combination thereof. And in certain embodiments, the oxidizing agent is or comprises potassium permanganate, potassium chromate, chromium trioxide, sodium chromate, sodium dichromate, potassium dichromate, potassium chlorochromate, sodium bismuthate, potassium nitrate, sodium perborate, sodium hypochlorite, sodium chlorite, sodium chlorate, sodium perchlorate, sodium hypobromite, sodium bromite, sodium bromate, sodium perbromate, osmium tetroxide, ruthenium tetroxide, or a combination thereof. In some embodiments, the oxidizing agent does not comprise chromium. And in certain embodiments, the oxidizing agent is a permanganate, such as potassium permanganate.

The method may be performed at an operating pressure suitable to facilitate production of the halogen gas. In some embodiments, the pressure is atmospheric pressure, or less than atmospheric pressure, such as from greater than zero to less than 1 atmosphere, from 1 Torr to 650 Torr, from 10 Torr to 600 Torr, from 50 Torr to 500 Torr, from 50 Torr to 300 Torr, or from 100 Torr to 250 Torr. A person of ordinary skill in the art understands that these pressures are the pressures at which the gas comprising the halogen is produced. A method for using the generated gas may be at the same pressure or at a different, such as higher or lower, pressure. For example, uses such as chemical beam etching may require pressures substantially less that the pressures used to generate the gas, such as about 5 orders of magnitude less.

The vapor may be partially or fully produced from evaporation of a halide compound reservoir. The halide compound reservoir may be at a temperature suitable to facilitate production of the vapor at the operating pressure. The halide compound reservoir may be at ambient or room temperature, or it may be heated to a higher than ambient temperature, or cooled to lower than an ambient temperature. A person of ordinary skill in the art will appreciate that at a vacuum is applied to a system comprising the halide compound, an equilibrium will be achieved at the vapor pressure of the halide compound. Therefore, the operating pressure of the system can be varied by changing the temperature of the halide compound reservoir, which in turn will change the vapor pressure of the halide compound. In some embodiments, the halide compound reservoir is cooled to below ambient temperature, thereby lowering the vapor pressure and facilitating a lower operating pressure.

In some embodiments, the halide compound is at a temperature of from −200° C. or less to 50° C. or more, such as from −80° C. to 30° C., from −40° C. to 25° C., or from 0° C. to 25° C.

In one embodiment, the method comprises contacting potassium permanganate with acetyl chloride vapor at 600 Torr and from 20° C. to 30° C. to produce a gas stream comprising chlorine gas.

In one embodiments, the method comprises contacting potassium permanganate with acetyl bromide vapor at 130 Torr and from 20° C. to 30° C. to produce a gas stream comprising bromine gas.

In some embodiment, 5 to 10 mL of halide compound used with a stoichiometric excess of the oxidizing agent compared to the halide on the halide compound, such that the halide compound is the limiting reagent. In some embodiments, from greater than 1 equivalent to 10 equivalents or more of the oxidizing agent is used, such as from 1.2 to 10 equivalents, from 1.5 to 5 equivalents, or from 2 to 4 equivalents of oxidizing agent.

B. System

Also disclosed is a system suitable for performing the disclosed method. FIG. 1 provides an exemplary system 2. With respect to FIG. 1, system 2 comprises a halide compound reservoir 4 fluidly connected to an oxidizing agent support 6. The oxidizing agent support can be any structure that supports oxidizing agent 8 to prevent it from moving into the reservoir, and also facilitates contact between the vapor comprising the halide compound and the oxidizing agent 8. In the exemplary system illustrated in FIG. 1, oxidizing agent support 6 is a glass sintered disc.

The gas stream comprising the halogen gas exits system 2 through tube 10. The pressure within system 2 can be lowered by connecting tube 10 to a vacuum system (not shown), which also facilitates the gas stream leaving system 2. The vacuum system may be part of an apparatus that requires a source of a halide gas. For example, tube 10 may be fluidly connected to a beam etching apparatus operating at a pressure lower than atmospheric pressure. The vacuum system for the beam apparatus may lower the pressure within system 2, and facilitate flow of the gas stream from system 2 to the beam apparatus via tube 10.

A person of ordinary skill in the art will understand that when a vacuum is applied through tube 10, a portion of a halide compound in halide compound reservoir 4 will evaporate and contact oxidizing agent 8, thereby forming the gas stream. Optionally, system 2 may comprise tap 12 that can open or close tube 10. When open, tap 12 facilitates flow of the gas stream out of tube 10 in response to the applied vacuum. However, when closed, tap 12 prevents the halogen gas from leaving system 2. Therefore, system 2 can provide halogen gas on demand by opening and closing tap 12. Furthermore, because the halogen gas is only produced as needed, system 2 does not require halogen gas storage that might also require gas sensors, vented storage areas, and/or specialized and expensive containment materials, such as Hastelloy. And because the system and method generates the halogen gas from readily available, and inexpensive, halide compounds, such as acetyl chlorine or acetyl bromide, the difficulties and costs associated with transporting halogen gases are significantly removed or eliminated.

Additionally, system 2 may comprise tap 14. Tap 14 typically is closed during operation, but can be used to release the vacuum in system 2, for example, to facilitate refilling reservoir 4 and/or replacing to replenishing oxidizing agent 8. Tap 14 also may be connected to an inert gas or air line, for example, to flush the system to remove residual halogen gas.

IV. Applications

The halogen gas stream produced by the disclosed method and/or system may be useful for any application where a halogen gas is desired, particularly a controllable stream of halogen gas. In some embodiments, the halogen gas stream was used for ion beam etching. Typically, in ion beam etching, a beam of charged particles are directed at a substrate with a suitable mask in a high vacuum chamber. Reactive ion species, such as halogens, particularly chlorine or bromine, can be added to the beam to enhance material etching. For example, using the disclosed method with acetyl chloride or acetyl bromide to produce a halogen gas stream, etching of an aluminum substrate was enhanced by from 40 to 100 times, compared to ion beam etching performed without a halogen gas. The enhancement also may be due to the presence of oxidation products of the acetyl moiety, such as acetic anhydride, in the gas stream. Without being bound to a particular theory, the present of the oxidization products of the acetyl moiety, such as acetic anhydride, may help to volatize the $AlCl_3$ or $AlBr_3$ formed during the etching process with the respective halogen gas.

Additionally, silica etching is enhanced by from 10 to 20 times, compared to silica ion beam etching without an added halogen gas stream.

Furthermore, a typical ion beam etching system operates at a pressure significantly lower than atmospheric pressure, such as around $10^{-5}$ to $10^{-6}$ Torr. By operating the halogen gas generator at a reduced pressure compared to atmospheric pressure, the halogen gas stream also is at a lower than atmospheric pressure. Therefore, it is significantly easier to reduce the already low pressure of halogen gas stream produced by the disclosed method down to a pressure suitable for ion beam etching, than it is to reduce a halogen gas stream at atmospheric pressure or greater, such as a gas stream produced by a gas bottle or halogen box.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A method, comprising contacting a solid oxidizing agent with a gaseous acyl halide compound to produce a gas stream comprising a halogen gas, wherein the contacting step is at a pressure of from 1 Torr to 650 Torr.

2. The method of claim 1, wherein the gaseous acyl halide compound is an acetyl halide, oxalyl halide, or a combination thereof.

3. The method of claim 1, wherein the gaseous acyl halide compound is acetyl chloride or acetyl bromide.

4. The method of claim 1, wherein the gaseous acyl halide compound is oxalyl chloride or oxalyl bromide.

5. The method of claim 1, wherein the halogen gas is chlorine.

6. The method of claim 1, wherein the halogen gas is bromine.

7. The method of claim 1, wherein the oxidizing agent comprises a permanganate, dichromate, hypochlorite, hypobromite, chlorate, bromate, chlorite, bromite, perchlorate, perbromate, chlorochromate, perborate, bismuthate, nitrate, chromate, trioxide, tetroxide, or a combination thereof.

8. The method of claim 1, wherein the oxidizing agent comprises lithium, calcium, barium, sodium, potassium, magnesium, chromium, osmium, ruthenium, or a combination thereof.

9. The method of claim 1, wherein the oxidizing agent comprises potassium permanganate, potassium chromate, chromium trioxide, sodium chromate, sodium dichromate, potassium dichromate, potassium chlorochormate, sodium bismuthate, potassium nitrate, sodium perborate, sodium hypochlorite, sodium chlorite, sodium chlorate, sodium perchlorate, sodium hypobromite, sodium bromite, sodium bromate, sodium perbromate, osmium tetroxide, ruthenium tetroxide, or a combination thereof.

10. The method of claim 1, wherein the pressure is from 50 Torr to 300 Torr.

11. The method of claim 1, wherein the pressure is from 100 Torr to 250 Torr.

12. The method of claim 1, wherein the gaseous acyl halide compound is at a temperature of from −200° C. to 50° C.

13. The method of claim 12, wherein the temperature is from −80° C. to 30° C.

14. The method of claim 12, wherein the temperature is from 0° C. to 25° C.

15. The method of claim 12, comprising contacting the solid oxidizing agent with the gaseous acyl halide compound at a vapor pressure of the gaseous acyl halide compound at the temperature.

16. The method of claim 1, wherein the gaseous acyl halide compound comprises acetyl halide, and the gas stream further comprises acetic anhydride.

17. The method of claim 1, comprising contacting potassium permanganate with acetyl chloride vapor at 600 Torr and from 20° C. to 30° C. to produce a gas stream comprising chlorine gas.

18. The method of claim 1, comprising contacting potassium permanganate with acetyl bromide vapor at 130 Torr and from 20° C. to 30° C. to produce a gas stream comprising bromine gas.

19. The method of claim 1, further comprising using the gas stream in an ion beam apparatus.

20. The method of claim 1, comprising contacting a solid oxidizing agent selected from potassium permanganate, potassium chromate, chromium trioxide, sodium chromate, sodium dichromate, potassium dichromate, potassium chlorochormate, sodium bismuthate, potassium nitrate, sodium perborate, sodium hypochlorite, sodium chlorite, sodium chlorate, sodium perchlorate, sodium hypobromite, sodium bromite, sodium bromate, sodium perbromate, osmium tetroxide, ruthenium tetroxide, or a combination thereof, with a vapor comprising an acyl chloride or an acyl bromide, wherein the acyl chloride or acyl bromide is at a temperature of from −200° C. to 50° C., and the method is performed at a vapor pressure of the acyl chloride or acyl bromide at the temperature.

* * * * *